2,828,322

HYDROXY THIOALIPHATIC ACIDS AND METHODS OF PREPARING THE SAME

Milon W. Bullock, Pearl River, N. Y., assignor to American Cyanamid Company, New York, N. Y., a corporation of Maine No Drawing. Application October 19, 1953
Serial No. 387,026

10 Claims. (Cl. 260—399)

This invention relates to new organic compounds. More particularly, it relates to hydroxy thioaliphatic acids, esters and salts thereof and methods of preparing the same.

In my copending application, Serial Number 284,205, filed April 24, 1952, I describe the preparation of omega-[3-(1,2-dithiolamyl)]aliphatic acids, salts and esters thereof. These compounds were described as oxidation inhibitors and growth supporting factors for certain microorganisms including *S. facelis*, *Tetrahymena geleii* and some corynebacterium species. Also disclosed in the said application was the use of hydroxythiolaliphatic acids, esters and salts thereof as intermediates in the preparation of the new active compounds. The present application is a continuation-in-part of application, Serial Number 284,205 and describes and claims the said intermediates.

The new compounds of the present invention may be illustrated by the following structural formula:

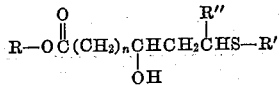

in which R is hydrogen, lower alkyl, or alkali metal radical, R' is hydrogen, alkyl, monocyclic aryl substituted lower alkyl or lower fatty acid acyl radical, R'' is hydrogen or a lower alkyl radical and n is a whole number less than 7. In the above formula the alkyl radicals can be methyl, ethyl, propyl, butyl, isobutyl, amyl, and the like. The lower fatty acid acyl radicals can be acetyl, propionyl, butyryl, valeryl, etc.

The compounds of the present invention are, in general, liquids at room temperature. They are immiscible with water and soluble or miscible, in general, with organic solvents such as acetone, chloroform, ether, etc.

To prepare the compounds of the present invention it is preferred to reduce the thiosubstituted keto esters described and claimed in my copending application, Serial Number 387,025, filed October 19, 1953 with a reducing agent such as sodium borohydride, lithium aluminum hydride, aluminum isopropylate, and the like.

The reaction to prepare the compounds of the present invention may be illustrated as follows:

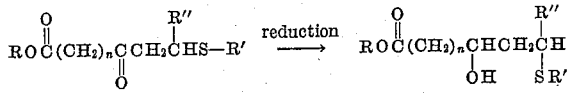

in which R is hydrogen, lower alkyl, or alkali metal radical, R' is hydrogen alkyl, monocyclic aryl substituted lower alkyl and lower fatty acid acyl radicals, R'' is hydrogen or a lower alkyl radical and n is a whole number less than 7.

The reaction is preferably carried out in the presence of an alcohol such as methyl alcohol, ethyl alcohol, propyl alcohol, isopropyl alcohol and the like. The reaction will usually take place at room temperature, however, temperatures of from 0° to 85° C. can be used. Following the reduction most of the solvent is distilled, the residue is diluted with water and the product recovered by extracting with suitable solvents such as chloroform or ether. The product can be obtained by distilling off the solvent and purifying by distillation under reduced pressure.

The esters groups and the lower fatty acid acyl radicals can be hydrolyzed in the usual manner to produce the free carboxylic acid radical and mercaptan group (—SH) respectively. If desired, salts of the free carboxylic acid can be prepared by treating the same with alkali metal or alkaline earth metal hydroxides and the like.

The following examples illustrate in greater particularity the preparation of the compounds of the present invention.

Example 1

To 8.0 g. (0.0435 mole) of ethyl $\Delta^{7,6}$-ketooctenoate contained in a 50 ml. flask equipped with a condenser was added 3.62 g. (0.048 mole) of thioacetic acid. The reaction was rapid and exothermic. The excess thioacetic acid was distilled off under the reduced pressure of an aspirator. The product was taken up in methanol and 4 g. (large excess) of sodium borohydride was added in small portions. The reaction was left standing overnight. The solution was made strongly alkaline by the addition of 10 g. of KOH in 15 ml. of water and refluxed three hours. The methanol was distilled off and replaced by water. The aqueous solution was acidified and the product extracted with two 25 ml. portions of chloroform. The combined chloroform extracts were dried over sodium sulfate and distilled leaving 8.0 g. (0.0416 mole) of an almost colorless oil. Approximately 1 ml. of this oil was subjected to distillation under reduced pressure. The product distilled 164° C. at 0.05 mm. and had equivalent weight 211 suggesting that the 8-thio-6-hydroxyoctanoic acid partially lactonized on distillation.

Example 2

In a two liter three-neck flask equipped with stirrer, condenser and dropping funnel were placed 95.2 g. (0.356 mole) of ethyl 8-acetylthio-6-ketooctanoate and 200 ml. of distilled methanol. The flask was cooled in an ice bath while 180 ml. of a sodium borohydride solution containing one mole of sodium borohydride per liter was added. A test for excess reducing agent (acidified aliquot) showed that no excess sodium borohydride was present. An additional 100 ml. of the sodium borohydride solution was added. An excess of sodium borohydride was now present. The solution was allowed to warm up to room temperature and the methanol distilled off. The syrupy residue was diluted with chloroform and then water. The chloroform which had a milky appearance was washed once with dilute sulfuric acid and dried over a mixture of sodium bicarbonate and sodium sulfate. Distillation of the chloroform solution left a thick oil containing some solid. Five ml. of water and 20 ml. of chloroform were added and the solvents distilled off under reduced pressure on the steam bath. The oily product, weight 77 g., was purified by distillation under reduced pressure. The fraction distilling 140°–132° at 0.1–0.05 mm. was collected as product. The yield was 57.7 g. (0.220 mole), 62%. The pure material has $N_D^{20}$ 1.4670 and $d^{20}$ 1.055.

A solution of 11.0 g. (0.166 mole or 85%) potassium hydroxide in 40 ml. of water was added to 20 g. (0.0763 mole) of ethyl 8-acetylthio-6-hydroxyoctanoate. The reaction appeared to be exothermic and the second phase disappeared when the flask was shaken. The resulting solution was left standing thirty-six hours. The solution was diluted with 400 ml. of water and extracted with 100 ml. of ether. Distillation of the either extract left 0.5 g. of oil which was discarded. The aqueous solution was acidified with hydrochloric acid and extracted three times with 100 ml. portions of ether. The combined ether extracts were dried over sodium sulfate and distilled leaving 13.5 g. of oil. This product was subjected to distillation under reduced pressure. The fractions were collected as follows:

| No. | Boiling Point | Pressure, millimeters | Weight | $n_D$ | Neutral Equivalent |
|---|---|---|---|---|---|
| 1 | 142-148 | 0.05 | 1.0 | $1.5091^{21}$ | |
| 2 | 148-172 | 0.05 | 2.5 | $1.5079^{22}$ | |
| 3 | 172-168 | 0.05 | 5.0 | $1.4988^{22}$ | 285 |
| 4 | 168-160 | 0.05 | 1.0 | $1.4989^{21}$ | 278 |
| 5 | 160-164 | 0.05 | 1.0 | $1.5162^{21}$ | |
| Distilling residue | | | 2.5 | | |

Yield of all products distilling, 10 g. (0.052 mole), 68% calculated as the acid. The product appears to be a mixture of the acid and its lactone. This was confirmed by infrared studies.

Example 3

Sixteen and four-tenths grams (0.067 mole) of ethyl 7-acetylthio-5-ketoheptanoate were diluted with 100 ml. of ethanol. The solution was stirred with a magnetic stirrer while a solution of 1 g. (0.027 mole) of sodium borohydride in 50 ml. of ethanol was added over a period of fifteen minutes. The reaction was slightly exothermic. A test for excess reducing agent was positive. The alcohol was distilled off on the steam bath, the major portion at atmospheric pressure and the last under slightly reduced pressure. Water was added to the residue and the product extracted with two 100 ml. portions of ether. The combined ether extracts were washed with 4 N sulfuric acid and with half-saturated sodium bicarbonate solution. Distillation of the dried (sodium sulfate) ether extracts left 13.5 g. of an oil. This oil was purified by vacuum distillation. The fraction distilling 108°–110° at 0.04 mm. was collected as product. The yield of ethyl 7-acetylthio-5-hydroxyheptanoate was 11.3 g. (0.0455 mole), 68%. This product had $n_D^{20}$ 1.4800 and $n^{20}$ 1.090.

Example 4

In a 500 ml. two-neck flask were placed 52.5 g. (0.191 mole) of ethyl 8-acetylthio-6-ketononanoate and 150 ml. of distilled ethanol. The reaction mixture was stirred with a magnetic stirrer while a solution of 3.8 g. (0.0955 mole as 95%) sodium borohydride was added over a period of fifteen minutes. The temperature of the reaction mixture rose to about 70° from the heat of reaction. A test for excess reducing agent was positive. The ethanol was distilled off on the steam bath, first at atmospheric pressure and finally under reduced pressure. The residue was diluted with 200 ml. of ether and a solid filtered off. The ether solution was washed with water, with dilute sulfuric acid and dried over sodium sulfate containing a small amount of sodium bicarbonate. Distillation of the ether solution gave 44 g. of a yellow oil which was purified by two distillations to yield 29.0 g. (0.105 mole), 55% of ethyl 8-acetylthio-6-hydroxynonanoate, boiling point 108°–109° at 0.05 mm., $n_D^{20}$ 1.4678, $d^{20}$ 1.036.

Example 5

In a 500 ml. stillpot were placed 40.0 g. (0.145 mole) of ethyl 8-acetylthio-6-ketononanoate and 200 ml. of dry isopropanol containing 37.4 g. (0.183 mole) of distilled aluminum isopropylate. The resulting solution was refluxed through an efficient column and acetone was taken off at the top. After six hours an additional 20 g. (0.098 mole) of aluminum isopropylate in 100 ml. of isopropanol were added. After an additional hour a test for acetone in the distillate showed that the reaction was nearing completion. After refluxing overnight only a very small amount of acetone could be obtained indicating that the reduction was complete. Most of the solvent was distilled off and the residue shaken with 500 ml. of cold 1:4 hydrochloric acid. The product was extracted with two 100 ml. portions of chloroform. The combined chloroform extracts were washed with dilute hydrochloric acid, half-saturated sodium bicarbonate solution and dried over sodium sulfate. Distillation of the solvent left an oil which was purified by vacuum distillation. The product, ethyl 8-acetylthio-6-hydroxynonanoate, distilled 111°–115° at 0.04 mm. The yield was 29.1 g. (0.1055 mole), 72.5%. The product from this reduction had $n_D^{20}$ 1.4714 and $d^{20}$ 1.010.

Example 6

In a 500 ml. three-neck flask equipped with stirrer, condenser and dropping funnel were placed 73 g. (0.236 mole) of ethyl 8-benzylthio-6-ketooctanoate and 250 ml. distilled ethanol. A solution of 9.4 g. (0.236 mole) of sodium borohydride in 50 ml. alcohol was added over a period of ten minutes. The slightly exothermic reaction was stirred one hour and the solvent distilled off on the steam cone. The residue was triturated with 200 ml. of water and the product extracted with two 100 ml. portions of ether. The combined ether extracts were washed with sodium bicarbonate solution, dried over sodium sulfate and distilled. The oily residue was purified by vacuum distillation. The fraction distilling 184°–200° at 0.1 mm. was collected as product. The yield was 39 g. (0.125 mole), 53%. A sample was redistilled to obtain an analytical sample. The purified material, ethyl 8-benzylthio-6-hydroxyoctanoate, boiling point 196° at 0.05 mm. and had $n_D^{20}$ 1.5313 and $d^{20}$ 1.076.

I claim:

1. Compounds having the formula:

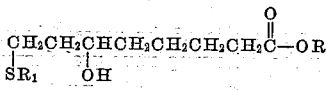

in which $R_1$ is a member of the group consisting of hydrogen, benzyl, and an acetyl radical and R is a member of the group consisting of hydrogen and a lower alkyl radical.

2. Compounds having the formula:

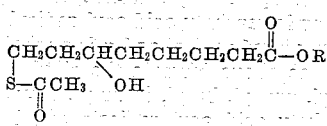

in which R is a lower alkyl radical.

3. 8-thiol-6-hydroxyoctanoic acid.
4. Ethyl 8-acetylthio-6-hydroxyoctanoate.
5. Ethyl 8-benzylthio-6-hydroxyactanoate.
6. A method of preparing 8-thiol-6-hydroxyoctanoic acid which comprises reacting ethyl 8-acetylthio-6-ketooctanoate with sodium borohydride and subsequently with an alkali metal hydroxide and acidifying the resulting product.

7. A method of preparing compounds having the general formula

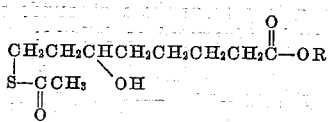

in which R is a lower alkyl radical, which comprises reacting a compound having the formula:

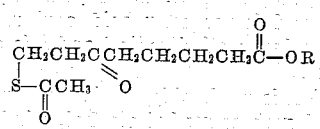

in which R is as defined above, with sodium borohydride and recovering said product therefrom.

8. A method of preparing compounds having the general formula:

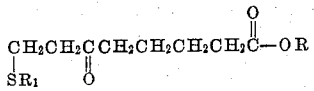

in which $R_1$ is a member of the group consisting of hydrogen, benzyl, and an acetyl radical and R is a member of the group consisting of hydrogen and lower alkyl radicals which comprises reacting a compound having the formula

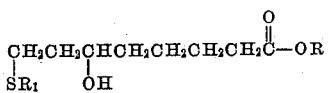

in which R and $R_1$ are as defined above with a member of the group consisting of sodium borohydride, aluminum isopropylate, and lithium aluminum hydride and recovering said compound therefrom.

9. A method of preparing ethyl 8-acetylthio-6-hydroxyoctanoate which comprises reacting ethyl 8-acetylthio-6-ketooctanoate with sodium borohydride.

10. A method of preparing ethyl 8-benzylthio-6-hydroxyoctanoate which comprises reacting ethyl 8-benzylthio-6-ketooctanoate with sodium borohydride.

References Cited in the file of this patent
UNITED STATES PATENTS

| | | |
|---|---|---|
| 2,568,648 | McCool | Sept. 18, 1951 |
| 2,759,005 | Starker et al. | Aug. 14, 1956 |

OTHER REFERENCES

"Reduction of Organic Compounds by Lithium Aluminum Hydride, II Carboxylic Acids," by R. F. Nystrom and W. G. Brown J. A. C. S. 69 (1947), pages 2548–49.

Fieser and Fieser: Organic Chemistry, 1950, pages 116, 117, 126 and 209.

Bullock et al.: Journal of the American Chemical Society, vol. 74, 3455 (1952).